United States Patent Office  2,901,887
Patented Sept. 1, 1959

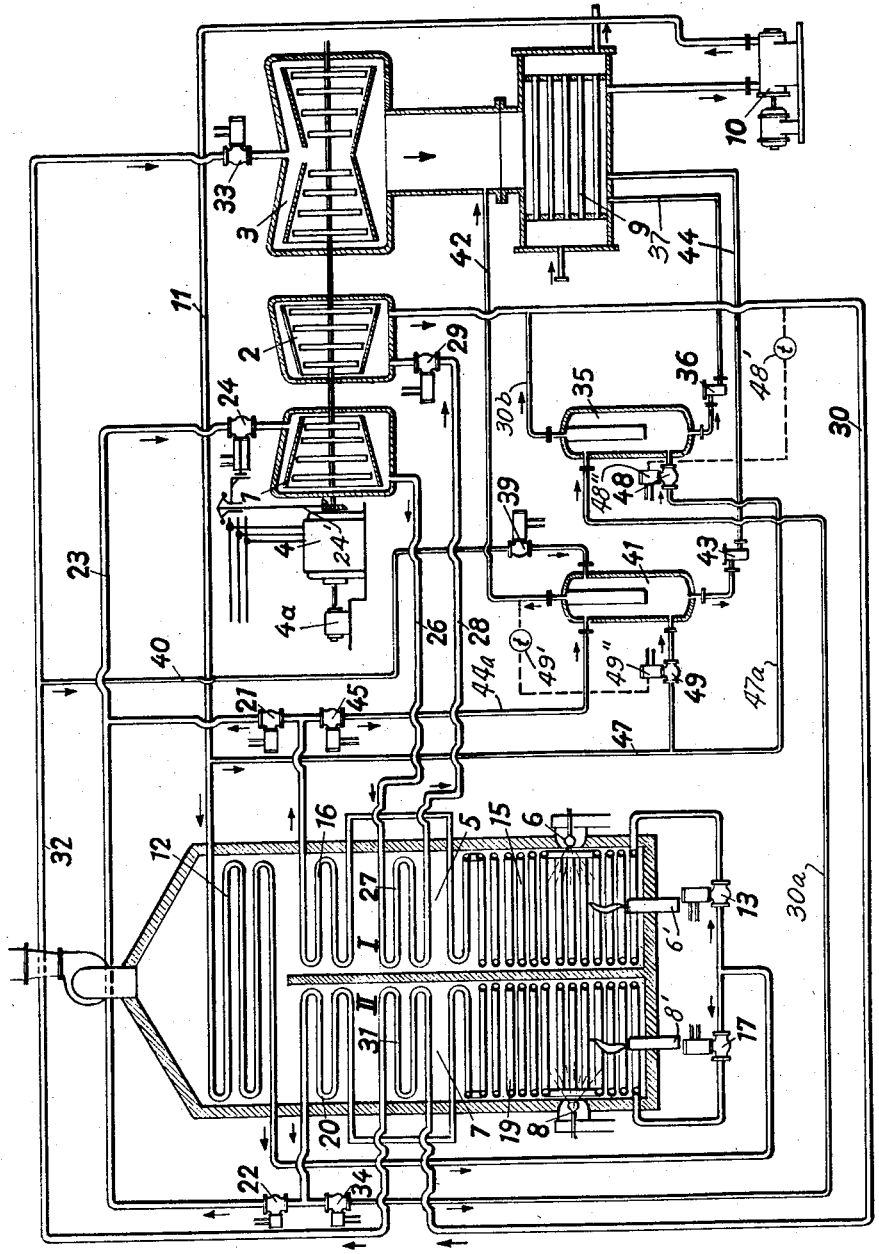

2,901,887

SYSTEM FOR STARTING AND TEMPORARILY TAKING THE LOAD OFF A STEAM POWER PLANT HAVING MULTISTAGE REHEATING

Alfred Buri, Winterthur, Switzerland, assignor to Sulzer Freres, Societe Anonyme, Winterthur, Switzerland, a corporation of Switzerland Application October 29, 1954, Serial No. 465,664

Claims priority, application Switzerland October 31, 1953

7 Claims. (Cl. 60—73)

The present invention relates to a system for starting a steam power plant, particularly a multistage reheating steam power plant for producing electric energy, and for temporarily taking the load off the steam power plant, and to a steam power plant including the system.

The invention is particularly concerned with steam power plants including a forced flow steam generator having at least two tube systems which are arranged in parallel with respect to water and steam flow and which are heated independently of each other. Each tube system includes an evaporating and a superheating part. The steam generator supplies a turbine plant having three expansion stages, a high pressure steam resuperheater being interposed between the high pressure and medium pressure turbine stages and heated by the heat supply means for one of said tube systems, and a low pressure steam resuperheater being interposed between the medium pressure and the low pressure turbine stages and heated by the heat supply means of another of said tube systems.

Steam power plants having two combustion chambers are usually built for great capacities. In plants of this type the resuperheaters must be arranged in a high temperature zone, as close as possible to the combustion chamber, so that enough heat can be transmitted to the steam which must be superheated. If the resuperheaters are placed close to a combustion chamber, they must be cooled by conducting steam therethrough as long as the combustion chamber is fired, or the fire must be kept so low that the resuperheaters cannot be damaged.

During starting of the plant the resuperheaters are normally not cooled as long as no steam flows through the turbine plant. If steam is conducted through the turbines, for example, for preheating the turbines, the steam must be at least so much superheated that it contains no water which may flood portions of the tube systems downstream of the turbines. So long as no steam flows through the resuperheaters, the fire in the respective combustion chamber must be kept very low. Particularly in large plants it takes, therefore, a long time until superheated steam is produced which can be conducted through the turbines. The starting-up of the plant to a condition at which the electric generator driven by the turbine plant can be connected to the net may take 12 to 24 hours.

It is an object of the present invention to provide a system for considerably reducing the starting time of a steam generating and turbine plant, in which system the following operations are performed:

(A) The second of two separately heated tube systems which are arranged in parallel with respect to the flow of water and steam through the tube systems is supplied with 15% to 40% of the amount of feed water which is needed for maximum sustained load, and the medium leaving the second tube system is conducted into the condenser, by-passing the turbine plant, (B) The second tube system is heated to a degree which does not damage the low pressure resuperheater which is heated by the same heating means as is the second tube system, (C) Upon production of steam in the second tube system, the steam is conducted through the low pressure resuperheater and heating of the second tube system is increased to between 15% and 40% of the maximum heat supply, (D) At least a portion of the steam produced in the second tube system, after it has reached superheat temperature, is conducted through the first two stages of the turbine plant and through the interposed high pressure resuperheater and is thereupon united with the rest of the superheated steam and conducted through the low pressure resuperheater and through the third turbine stage, (E) Thereupon heating of the first tube system is increased to between 15% and 40% of the maximum heating after the feed water supply to the first tube system has been raised to between 15% and 40% of the amount corresponding to maximum sustained load, the medium emerging from the first tube system being conducted into the condenser, (F) When the condition of the superheated steam is approximately the same at the outlets of the superheaters of both tube systems, the two systems are operated in parallel and a portion of the steam from both tube systems is conducted to the turbine plant which is thereby heated and accelerated to and maintained at normal speed without load, (G) Thereupon the electric generator driven by the turbine plant is connected with the net and all steam produced in both tube systems is conducted through the turbine plant and heating and feed water supply is increased to satisfy the load.

While one resuperheater is cooled immediately after steam has been produced, the output of the heating plant by which said resuperheater is heated can be increased, so that one of the tube systems can supply superheated steam much sooner than with conventional starting methods. Consequently, the turbine plant can be supplied with steam sooner, so that the second resuperheater can be cooled and the second tube system can be quickly brought up to normal operation. This interlinking of operating steps according to the invention, which steps are conventionally performed consecutively or simultaneously, considerably shortens the starting period. The amount of feed water supplied during the starting period should be small in order to afford a quick heating of the plant. The amount of feed water supplied during the starting period should not be too small, so that the velocity of the operating medium in the tubes is sufficiently great to afford adequate heat exchange and taking along of steam bubbles in downcomer tubes of steam generators operating at subcritical pressure. A satisfactory amount of feed water supplied during the starting period is between 15% and 40% of the amount of feed water corresponding to maximum sustained load.

In the aforedescribed operation D, a portion of the steam leaving the low pressure resuperheater can be conducted into the condenser, by-passing the third turbine stage. It is advisable to heat the first tube system prior to cooling of the high pressure resuperheater to a degree which does not damage the high pressure resuperheater. It is of particular advantage to heat the tube system, as long as the resuperheaters are not cooled, by fuels and auxiliary firing devices which serve to ignite the main firing apparatus. It is also recommended to regulate the temperature of the portion of the steam leaving the second tube system and being conducted to the low pressure resuperheater by injecting water into the steam.

It happens that electric generators must be temporarily disconnected from the net, for example, because of short circuits, grounding, or other disturbances. Steam turbines driving such electric generators are provided with safety governors for interrupting the steam supply and preventing racing of the turbine in case the load is taken off suddenly. This may necessitate shutting down of the entire plant until the disturbance is corrected. Because of uneven cooling of the interior of the turbines, one must wait till the turbines are completely cooled, before the entire plant can be slowly brought back to normal operation. The starting of the electric generator is therefore not possible within shorter periods than 12 to 24 hours. This time is too long compared with the time needed for correcting the disturbance in the electric system which may be only half an hour, or less.

The safety governor may be so adjusted that steam supply to the turbine is throttled only to such an extent that the turbine continues to run at normal speed and drives auxiliaries. Because it would be uneconomic to waste the surplus steam in large power plants or to conduct the surplus steam into the condenser, by-passing the turbine, firing of the steam generator and feed water supply thereto must be lowered. Heating of the tube systems must be reduced to such a degree that the resuperheaters which are cooled only by a very small amount of steam passing through the turbines, are not damaged. The amount of feed water, however, cannot be reduced to the same extent because a minimum velocity of the medium within the tubes of the steam generator is required. The steam entering the turbines has therefore a much lower temperature than during normal operation, so that the turbines are cooled not only by heat radiation to the outside, but also by the low temperature steam. This causes uneven cooling, so that the turbine must soon be brought to a standstill in order to prevent damage, and can only be brought back to normal operation after it has been completely cooled.

It is an object of the present invention to provide a system avoiding complete standstill of the turbines at a temporary disconnection of the electric generator from the net, in which system the following operations are performed:

(A) The generator is disconnected from the net, (B) Steam supply to the turbine plant is throttled to maintain the normal operating speed of the turbines now operating without load, and the rest of the steam produced in a first tube system is conducted directly into the condenser, the rest of the steam from a second tube system being conducted through a low pressure resuperheater into the condenser, so that the turbine plant is by-passed by the rest of the steam, (C) Heating of the first tube system is so much reduced as to avoid damage of the high pressure resuperheater which is cooled only by the small amount of steam passing through the turbines, (D) The amount of feed water supplied to the first tube system is reduced to between 15% and 40% of the amount corresponding to maximum sustained load, (E) The steam temperature is so controlled that it does not fall below 80% of the normal operating temperature in all stages of the turbine plant and in the interposed resuperheaters, (F) After correction of the disturbance, the electric generator is reconnected with the net, all superheated steam is conducted through the turbines, and the feed water supply and heating are increased.

During the time the electric generator is disconnected from the net, the turbine plant is operated almost solely by steam from one of the two tube systems. Since the resuperheater which is heated by the same heating means by which the tube system supplying steam to the turbine plant is heated, is cooled by steam flowing therethrough, heating and feed water supply can be so adjusted that the temperature of the steam flowing through the turbines is maintained at a normal operating level or not lower than 80% of the normal operating temperature. Therefore, the turbines are not completely cooled and can receive the normal amount of steam shortly after the disturbance in the electric distributing system is corrected and after the electric generator has been reconnected to the net.

The following steps may be taken after the operation B:

Heating of the second tube system is reduced to between 15% and 40% of maximum heating.

The amount of feed water supplied to the second tube system is reduced to between 15% and 40% of the amount corresponding to maximum sustained load.

In turbine plants which drive auxiliaries in addition to the electric generator, the steam supply in the method step B may be throttled only to such an extent that the energy supplied by the steam is sufficient for maintaining normal speed of the turbine plants and for operating the auxiliaries.

It is of advantage to cool by water injection the portion of the steam which is produced in the second tube system which is conducted into the low pressure resuperheater, by-passing the first two turbine stages and the interposed high pressure resuperheater. Thereby undesirable overheating of the low pressure resuperheater and downstream parts of the plant can be prevented.

The plant according to the invention comprises a steam generator including a first and a second tube system, which systems are heated separately, and a turbine plant having a high pressure stage, a medium pressure stage, and a low pressure stage, a high pressure steam resuperheater being interposed between the high pressure and the medium pressure turbine stage and heated by the same heating means as the first tube system. The steam leaving the medium pressure turbine stage is resuperheated in a low pressure resuperheater before the steam enters the low pressure turbine stage, the low pressure resuperheater being heated by the same heating means as the second tube system. A first conduit by-passing the first two turbine stages and the high pressure resuperheater is provided for interconnecting the outlet of the second tube system and the inlet of the low pressure resuperheater, and a steam cooler is interposed in the conduit from which cooler separated water may be conducted into the condenser. A second conduit is provided interconnecting the outlet of the first tube system and the condenser, a steam cooler being interposed in the second conduit and connected with the outlet of the low pressure resuperheater for receiving steam therefrom. Water separated in the last-mentioned steam cooler may be conducted separately into the condenser. At least one of the steam coolers may be equipped with water injection. The water injected into the first-mentioned steam cooler may be controlled in accordance with the temperature of the steam entering the low pressure resuperheater.

The novel features which are considered characteristic of the invention are set forth with particularity in the appended claims. The invention itself however and additional objects and advantages thereof will best be understood from the following description of an embodiment thereof when read in conjunction with the accompanying drawing, in which the one figure of the drawing is a diagram of a plant according to the invention.

Referring more particularly to the drawing, numeral 1 designates a high pressure turbine, numeral 2 a medium pressure turbine, and numeral 3 a low pressure turbine, all three turbines driving an electric generator 4 and an auxiliary machine 4a by means of a common shaft. The steam generator supplying steam for the turbines includes a first combustion chamber 5 served by a firing apparatus 6, and a second combustion chamber 7 served by a firing device 8.

During normal operation, water is pumped by means of a feed pump 10 from a condenser 9 through a conduit 11 into a preheater or economizer 12. One portion of the preheated water is conducted through a throttle valve 13 into an evaporator 15 and therefrom into a superheater 16, the evaporator 15 and the superheater 16 forming a first tube system (I) which system is fired by the device 6. The other portion of the preheated water is conducted through a throttle valve 17 into an evaporator 19 and therefrom into a superheater 20, the evaporator 19 and the superheater 20 forming a second tube system (II) which is fired by the device 8. The superheater 16 discharges through a valve 21 into a steam main 23, the superheater 20 discharging through a valve 22 into the same steam main 23. The steam conducted by the steam main 23 enters the high pressure turbine 1 through an inlet valve 24. The exhaust steam of the high pressure turbine 1 is conducted through a conduit 26 into a high pressure resuperheater 27 which is heated by the firing device 6. The outlet of the high pressure resuperheater 27 is connected with the medium pressure turbine 2 by means of a conduit 28 in which a valve 29 is inserted. The exhaust steam from the medium pressure turbine 2 flows through a conduit 30 into a low pressure resuperheater 31 which is heated by the firing device 8. The outlet of the low pressure resuperheater 31 is connected with the inlet of the low-pressure turbine 3 by means of a conduit 32 in which a valve 33 is inserted. The low pressure turbine 3 exhausts into the condenser 9.

For starting the above described plant, a liquid operating medium is pumped by the pump 10 from the condenser 9 through the conduit 11 and the preheater 12 into the tube system II which is heated by the firing device 8. The valve 17 is so adjusted that approximately 15% to 40% of the amount of feed water which corresponds to maximum sustained load flows through the tube system II. The medium leaving the superheater 20 is conducted through a by-pass valve 34 and a by-pass conduit 30a into a starting cooler 35 which acts as a water separator, the separated water passing through a steam trap 36 and a conduit 37 into the condensate side of condenser 9. During the starting period, the firing device 8 is so adjusted that the uncooled low pressure resuperheater 31 is not damaged. If steam emerges from the superheater 20, this steam passes through the cooler 35 and therefrom through conduits 30b and 30 into the low pressure resuperheater 31. Conduits 30a, 30b with the steam cooler 35 interposed therebetween, and conduit 30 form a first by-pass conduit which by-passes the first two turbine stages and the high pressure resuperheater and which interconnects the outlet of the second tube system and the inlet of the low pressure superheater. The resuperheated steam flows through the conduit 32 and a conduit 40, in which a valve 39 is interposed, into a second starting cooler 41, valve 33 being closed at this time. The operating medium flows either in the form of vapor or steam through a conduit 42 or in the form of separated liquid or water through a steam trap 43 and a conduit 44 into the condenser 9.

Since the low pressure resuperheater 31 is now cooled, the output of the firing device 8 can be increased to correspond to the amount of liquid fed into the tube system II, i.e. to about 15% to 40% of the maximum output. The operating medium is therefore heated more quickly and superheated steam is available at the outlet of the superheater 20 much sooner than in plants in which the resuperheater remains uncooled. The operating medium emerging from the superheater 20 still flows through the by-pass valve 34 and the portion of the medium which is in vapor state flows through the cooler 35 and conduits 30b and 30 into the low pressure resuperheater 31, cooling the latter. When the tube system II is sufficiently warmed up a portion of the steam emerging from the superheater 20 can be conducted through the valve 22 and through the steam main 23 into the high pressure turbine 1, and therefrom through the high pressure resuperheater 27 and into the medium pressure turbine stage 2. The exhaust steam of the medium pressure turbine 2 is united in the conduit 30 with the rest of the superheated steam which emerges from the conduit 30b. The total steam from the medium pressure turbine and from the conduit 30b flows through the low pressure resuperheater 31. When the tube system II is sufficiently warmed up, not all of the steam leaving the resuperheater 31 is conducted through the starting cooler 41 into the condenser, a portion of the steam which corresponds to the amount of steam passing through the first two turbine stages being conducted through the low pressure turbine stage 3 into the condenser 9.

The operation set forth in the paragraph next above affords heating of the turbine stages so that the turbines can be brought up to and maintained at normal speed, and the high pressure resuperheater 27 can also be cooled by steam, permitting increase of the output of the firing device 6 to between 15% and 40% of the maximum output. Already before the output of the firing device 6 is increased, feed water is pumped through the evaporator 15 and the superheater 16 in an amount corresponding to between 15% and 40% of the amount required for maximum sustained load. Prior to cooling of the high pressure resuperheater 27 by steam the output of the firing device 6 may be increased to such an extent that no damage is done to the high pressure resuperheater while the tube system I is being preheated.

The liquid leaving the superheater 16 is conducted through a by-pass valve 45 in a by-pass conduit 44a to a starting cooler 41 and flows therefrom through a steam trap 43 and a conduit 44 into the condensate side of the condenser 9. If vapor emerges from the superheater 16 and flows into the cooler 41, the vapor is conducted through the conduit 42 into the steam side of the condenser 9. The conduits 44a and 44 with the cooler 41 interposed therebetween form a second by-pass conduit by-passing the whole turbine plant and connecting the outlet of the first tube system with the condenser. When superheated steam emerges from the superheater 16 and the condition of this steam is approximately the same as that of the superheated steam emerging from the superheater 20, the two tube systems I and II can be operated in parallel, and at least a portion of the total steam is conducted through the turbine plant.

The electric generator can now be connected with an electric distributing system, whereupon all of the generated steam is conducted to the turbines and the feed water supply and fuel supply are increased until the turbines operate at normal load. It is of advantage to control the valve 48 which regulates the injection of water from the feed water conduit 11 through pipes 47 and 47a into the cooler 35 according to the temperature of the steam in the conduit 30 downstream of the connection with the conduit 30b by conventional means which include temperature sensing means 48' and valve actuating means 48". Similarly, the water supply to the cooler 41 from conduit 11 through the pipe 47 is controlled by a valve 49 actuated by a servomotor 49" which is controlled by a means 49' which is responsive to the temperature of the steam in the conduit 42. In this way the steam by-passed from the low pressure steam conduit 32 through by-pass pipe 40 and controlled by a valve 39 is cooled so that it can be liquefied in the condenser 9.

Conduit 40 forms a third by-pass conduit interconnecting the outlet of the low pressure resuperheater and the condenser and by-passing the low pressure turbine. If the generator 4 is disconnected from the net, unloading of the turbines causes closing of the valve 24, for example, by a conventional speed governor 24', throttling steam supply to such an extent that the turbines operate at normal speed and drive the auxiliary machine 4a. The surplus steam from the tube system which is heated by the device 8 is conducted through the by-pass valve 34, into the cooler 35, from which separated water is conducted through the steam trap 36 and the conduit 37 into the condenser 9. The cooled steam flows through the conduit 30b, the conduit 30, the low pressure resuperheater 31, the conduit 32, and the valve 39 in a conduit 40, which is connected with the conduit 32, into the cooler 41 and therefrom through the conduit 42 into the condenser 9. Water separated in the cooler 41 is conducted through the steam trap 43 and the conduit 44 into the condenser. Surplus steam from the tube system I heated by the firing device 6 is conducted through the by-pass valve 45 directly into the cooler 41 and therefrom into the condenser. Since the condenser cannot liquefy all surplus steam, the by-passed steam is cooled in the cooler 41 by means of water from the conduit 11. The surplus steam from the tube system II is precooled in the cooler 35 by means of water also taken from the conduit 11.

As soon as possible after closing of the valve 24, the output of the heating device 6 is so much reduced that no damage is done to the high pressure resuperheater 27 which is only slightly cooled by the little amount of steam now flowing through the high pressure turbine. The feed water supply to the tube system I which is heated by the device 6 is so much throttled that the medium flows through this tube system at the minimum permissible velocity, i.e. the amount of feed water supplied to this tube system is approximately 15% to 40% of the amount of feed water corresponding to maximum sustained load. Depending on the construction of the steam generator and the expected duration of the interruption of power production, normal feed water supply to the other tube system may be maintained or the feed water supply may be reduced to between 15% and 40% of the normal supply. The output of the heating device 8 is so controlled that the steam temperature at the outlet of the superheater 20 is not less than 80% of the normal temperature. This is possible because the low pressure resuperheater 31 is cooled and cannot be damaged by the heat produced by the device 8.

The turbine plant receives the required, now small, amount of steam substantially from the tube system I which is heated by the device 8. The balance of the steam produced in the same tube system is cooled in the cooler 35, prior to its confluence with the steam coming from the medium pressure turbine 2.

It is sufficient to supply the same amount of steam to the low pressure turbine 3 as is supplied to the high pressure turbine and medium pressure turbine, the balance of the steam being conducted through the valve 39 and the cooler 41 into the condenser. In this way, approximately normal operating temperature is maintained in all parts of the turbine and the full amount of superheated steam can again be supplied to the turbines within a short time after correcting the cause of the interruption of power consumption and the feed water and fuel supply can be increased accordingly.

The heating devices 6 and 8 may be of any conventional type, for example they may be suitable for firing gas, oil, or coal. Coal fired furnaces usually require an auxiliary firing system for igniting the coal which system is operated by means of oil or gas and which supplies less heat than the coal firing device. For this purpose an oil burner 6' is provided in the furnace of boiler I and an oil burner 8' is provided in the furnace of boiler II. It is often of advantage to use the auxiliary firing devices during starting of operation of the steam generator, so long as the resuperheaters are not cooled. If the load is temporarily taken off the steam power plant, the generator I is preferably heated by the auxiliary firing device 6' during the period in which the high pressure resuperheater 27 is only slightly cooled.

The following is a brief description of the operating steps for starting the plant according to the invention:
(A) Starting from cold:
(1) Starting the feed pump 10, partly opening valve 17 and fully opening valves 34 and 39, closing valves 21, 22, 45, 24, 29, 33;
(2) Starting firing device 8.

(B) Continuing operation after tube system II is warmed-up:
(1) Increasing fuel supply to device 8;
(2) Starting heating device 6, partly opening valve 13, gradually closing valve 34, gradually opening valves 22 and 24, slowly opening valves 29, 33, 45.
(C) Transition to normal operation:
(1) Fully opening valves 22, 21, 24, 17, and 13;
(2) Increasing fuel supply to devices 6 and 8;
(3) Gradually closing valves 34 and 45.

What is claimed is:
1. A steam power plant comprising, in combination, a forced flow steam generator including a first and a second tube system, each system including a superheater, a separate heating means for each tube system, a steam main connected to for receiving superheated steam from said superheaters, a high pressure turbine connected to for receiving steam from said steam main, a high pressure resuperheater operatively associated with and heated by the same heating means as said first tube system and being connected with for receiving steam from said high pressure turbine, a medium pressure turbine connected with for receiving steam from said high pressure resuperheater, a low pressure resuperheater operatively associated with and heated by the same heating means as said second tube system and connected with for receiving steam from said medium pressure turbine, a low pressure turbine connected with for receiving steam from said low pressure resuperheater, a condenser connected with for receiving steam from said low pressure turbine, a first steam conduit connecting the outlet of the superheater of said second tube system with the inlet of said low pressure resuperheater, a first steam cooler and water separator interposed in said first steam conduit, a water conduit connecting said first steam cooler and water separator with said condenser for conducting separated water into said condenser, a second steam conduit connecting the outlet of the superheater of said first tube system with said condenser, a second steam cooler and water separator interposed in said second steam conduit, a third steam conduit connecting the outlet of said low pressure resuperheater with said second steam cooler, and a water conduit connecting said second steam cooler and water separator with said condenser for conducting separated water into the latter.

2. A steam power plant as defined in claim 1, in which at least one of said coolers includes means for injecting water into the steam which must be cooled in the cooler.

3. A steam power plant comprising, in combination, a forced flow steam generator including a first and a second tube system, each system including a superheater, a separate heating means for each tube system, a steam main connected to for receiving superheated steam from said superheaters, a high pressure turbine connected to for receiving steam from said steam main, a high pressure resuperheater operatively associated with and heated by the same heating means as said first tube system and being connected to for receiving steam from said high pressure turbine, a medium pressure turbine connected to for receiving steam from said high pressure resuperheater, a low pressure resuperheater operatively associated with and heated by the same heating means as said second tube system and connected with for receiving steam from said medium pressure turbine, a low pressure turbine connected with for receiving steam from said low pressure resuperheater, a condenser connected with for receiving steam from said low pressure turbine, a first steam conduit connecting the outlet of the superheater of said second tube system with the inlet of said low pressure resuperheater, a first water injection steam cooler and water separator interposed in said first steam conduit, a water conduit connecting said first steam cooler and water separator with said condenser for conducing separated water into said condenser, a second steam conduit connecting the outlet of the superheater of said first tube system with said condenser, a second water injection steam cooler and water separator interposed in said second steam conduit, a third steam conduit connecting the outlet of said low pressure resuperheater with said second steam cooler, a water conduit connecting said second steam cooler and water separator with said condenser for conducting separated water into the latter, a valve connected with for regulating the water injected into the first steam cooler, temperature responsive means connected with said first steam conduit downstream of said first steam cooler and responsive to the temperature of the steam conducted to said low pressure superheater, and valve actuating means connected with said valve and with said temperature responsive means for opening said valve when the temperature of the steam conducted to said low pressure superheater exceeds a predetermined value.

4. A steam power plant comprising, in combination, a forced flow steam generator including a first and a second tube system, each system including a superheater, a separate heating means for each tube system, a steam main receiving superheated steam from said superheaters, a high pressure turbine receiving steam from said steam main, a high pressure resuperheater heated by the same heating means as said first tube system and receiving steam from said high pressure turbine, a medium pressure turbine receiving steam from said high pressure resuperheater, a low pressure resuperheater heated by the same heating means as said second tube system and receiving steam from said medium pressure turbine, a low pressure turbine receiving steam from said low pressure resuperheater, a condenser receiving steam from said low pressure turbine, a first by-pass conduit interconnecting the otulet of said second tube system with the inlet of said low pressure resuperheater, a second by-pass conduit interconnecting the outlet of said first tube system with said condenser, and a third by-pass conduit connecting the outlet of said low pressure resuperheater with said second by-pass conduit.

5. A steam power plant as defined in claim 4, including a cooler interposed in said first by-pass conduit and a cooler interposed in said second by-pass conduit.

6. A steam power plant according to claim 5 in which said third by-pass conduit terminates in the cooler interposed in said second by-pass conduit.

7. A steam power plant as defined in claim 1, including an economizer operatively associated with both of said heating means for receiving heat therefrom and connected with both of said tube systems for conducting preheated water into both tube systems.

References Cited in the file of this patent

UNITED STATES PATENTS

| | | |
|---|---|---|
| 2,685,280 | Blaskowski | Aug. 3, 1954 |
| 2,747,373 | Eggenberger et al. | May 29, 1956 |

FOREIGN PATENTS

| | | |
|---|---|---|
| 416,091 | Great Britain | Sept. 10, 1934 |
| 483,331 | Great Britain | Apr. 21, 1938 |
| 754,213 | Great Britain | Aug. 8, 1956 |